United States Patent [19]
de Givry

[11] 4,345,362
[45] Aug. 24, 1982

[54] PROCESS AND APPARATUS FOR STRIPPING INSULATED WIRES

[75] Inventor: Jacques de Givry, Les Loges En Josas, France

[73] Assignee: MATRA, Paris, France

[21] Appl. No.: 151,760

[22] Filed: May 21, 1980

[30] Foreign Application Priority Data

May 21, 1979 [FR] France .................. 79 12904

[51] Int. Cl.$^3$ ............................ H02G 1/12
[52] U.S. Cl. .................. 29/426.5; 29/867; 29/564.4; 81/9.51
[58] Field of Search ......... 81/9.51, 9.5 R, 9.5 A; 29/426.5, 564.4, 33 M, 867

[56] References Cited

U.S. PATENT DOCUMENTS

| | | | |
|---|---|---|---|
| 3,363,309 | 1/1968 | Logan et al. | |
| 3,364,801 | 1/1968 | Johnson | 81/9.51 |
| 3,537,339 | 11/1970 | Carpenter | 81/9.51 |
| 3,614,905 | 10/1971 | Bieganski | 81/9.5 R |
| 4,027,557 | 6/1977 | Stepan | 81/9.5 R |
| 4,051,749 | 10/1977 | Bell et al. | 81/9.51 |
| 4,091,695 | 5/1978 | Funcik et al. | 81/9.51 |

FOREIGN PATENT DOCUMENTS

1615566 6/1970 Fed. Rep. of Germany .

*Primary Examiner*—Roscoe V. Parker
*Attorney, Agent, or Firm*—John T. Synnestvedt; Albert L. Free

[57] ABSTRACT

For locally stripping an electric wire, the wire is maintained in a guide, the insulating material is cut with rotary knives over a fraction only of its thickness and the residual insulation material is broken by pulling after the knives have been stopped. An apparatus for carrying out the process has a stripping head supporting a wire-guide, provided with a drive motor for rotation about the axis of the guide and carrying knives radially movable between an inner and an outer position. An electromagnetically controlled wire-clamping system is used for axially moving the wire.

8 Claims, 5 Drawing Figures

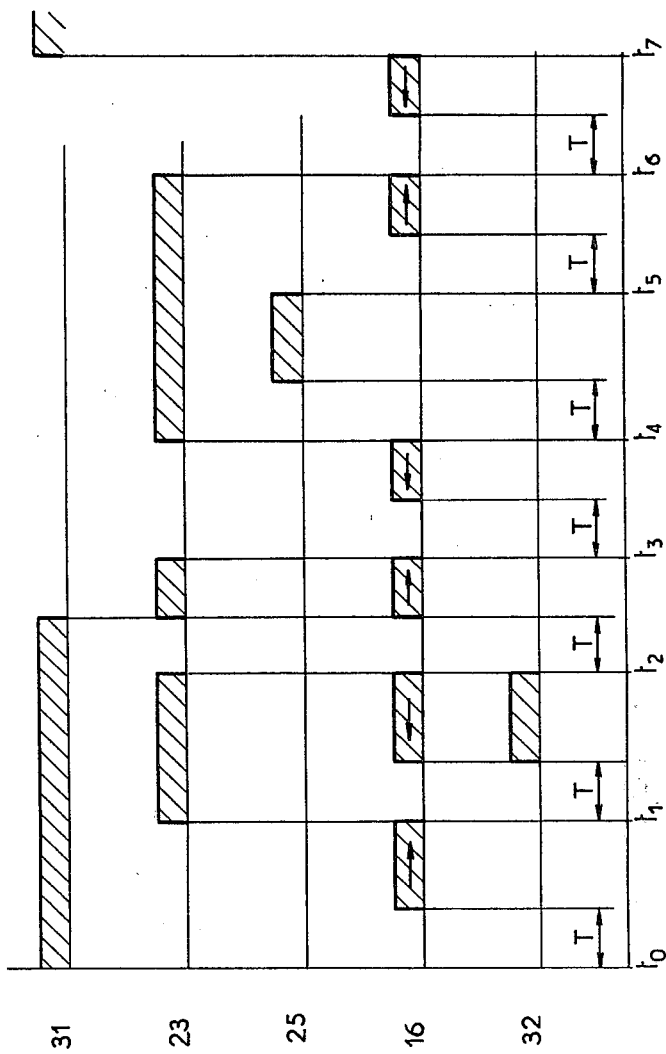

PROCESS AND APPARATUS FOR STRIPPING INSULATED WIRES

BACKGROUND AND SUMMARY OF THE INVENTION

The present invention relates to a process and an apparatus for stripping insulated wires, particularly multistrand electric wires.

To reduce the time spent in interconnecting components with insulated wires, wire sections cut to a standard length are widely used, whose end portions are stripped over an appropriate length. Rotary-knife apparatuses exist for preparing such wires with stripped ends; they typically have knives which continuously rotate and whose spacing may be controlled. The knives are spread apart to introduce the required length of wire to be stripped, then moved toward each other to make a cut in the insulator up to the core of the wire; then the wire is pulled so as to remove the fragment of insulating sheath covering the part to be stripped and which is retained by the knives.

That approach has shortcomings. The rotary knives which retain the detached insulating fragment often damage the stripped metal core during removal of the wire, for the core cannot be maintained strictly along the axis of rotation of the knives during extraction of the wire. Those present-day machines which are automatic in operation prepare, from a coil of wire, sections of constant length with stripped ends. To change the length of the sections, the adjustment of the machine must be modified. Thus stocks of sections of different lengths are obtained, separated from each other. The operator must subsequently select a wire section of appropriate length. The stripped ends of multistrand wires may untwist.

It is an object of the invention to provide an improved process and apparatus for locally stripping insulated wires. It is a more specific object to overcome the risk of damaging the stripped part of the wires. It is still another object to provide an apparatus which is single in construction and operation and supplies a product more easily usable by a wiring operator.

A process for locally stripping insulated wires according to a first aspect of the invention comprises the steps of retaining the wire in guide means, cutting the insulation material with rotary knives over a fraction only of its thickness, bringing the knives at rest and pulling the wire for breaking the insulation material where cut.

A local stripping apparatus according to another aspect of the invention comprises a frame; a stripping head mounted on said frame for rotation about an axis; a wire guide carried by said head coaxially with said axis; a drive motor operatively associated with said head for rotating said head about said axis; a set of knives carried by said head and radially movable on said head toward said axis to a position where they define a gap less than the diameter of a wire passage in said wire guide and away from said axis; a unit for axially moving a wire projecting through said guide comprising an axially movable member, electrically controlled wire-clamping means carried by said axially movable member; and control means for successively actuating said clamping means for engaging said wire, axially moving said clamping means over a predetermined length, closing and rotating said knives to cut the insulating material over a fraction of its thickness stopping said drive motor and axially moving back said clamping means to tension the wire and break the remaining thickness of the insulating material where partially cut by the knives.

The invention will be better understood from the following description of a particular embodiment, given by way of example. The description refers to the accompanying drawings.

SHORT DESCRIPTION OF THE DRAWINGS

FIG. 5 is a diagram illustrating the operation of the apparatus of FIG. 2.

DETAILED DESCRIPTION OF AN EMBODIMENT

Figure 1:
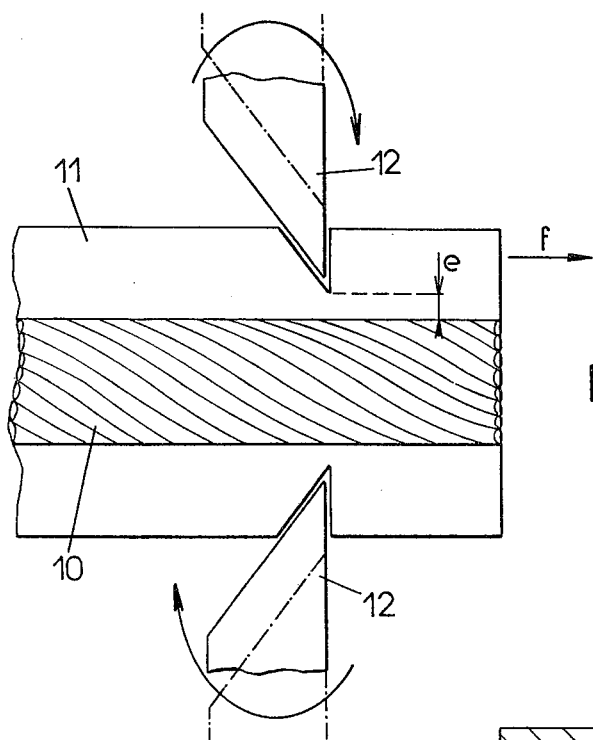
FIG. 1 is a diagram showing how the insulating material is cut.

Referring to FIG. 1, the successive operations which take place during local stripping, or at least during preparation for local stripping, of a fraction of an electric wire comprising a multistrand core 10 and an insulating sheath 11 will be described.

The wire is introduced through a guide (not shown) along the axis of rotation of a set of knives or blades 12, two in number for example, while the knives are spaced apart to leave free a gap whose size is greater than the diameter of the sheathed wire (position shown in dash lines). The wire is introduced until it projects over a length to be stripped. The knives are then moved together to bring them into the position shown in full line and are rotated so as to make a cut. The extent of closing movement of knives is determined so that there remains a residual insulation thickness, which would be uniformly equal to e (FIG. 1) if the wire were exactly centered, which is generally not the case. The residual thickness e is chosen so that the core 10 is not damaged by the knives even for the maximum misalignment. The rotation of the knives is then stopped and a pulling force is exerted on the insulation material from one side of knives 12, for example as shown by arrow f, to break the residual collar of thickness e, the knives acting as a stop for the insulation material on which the pull is not exerted.

Figure 2:
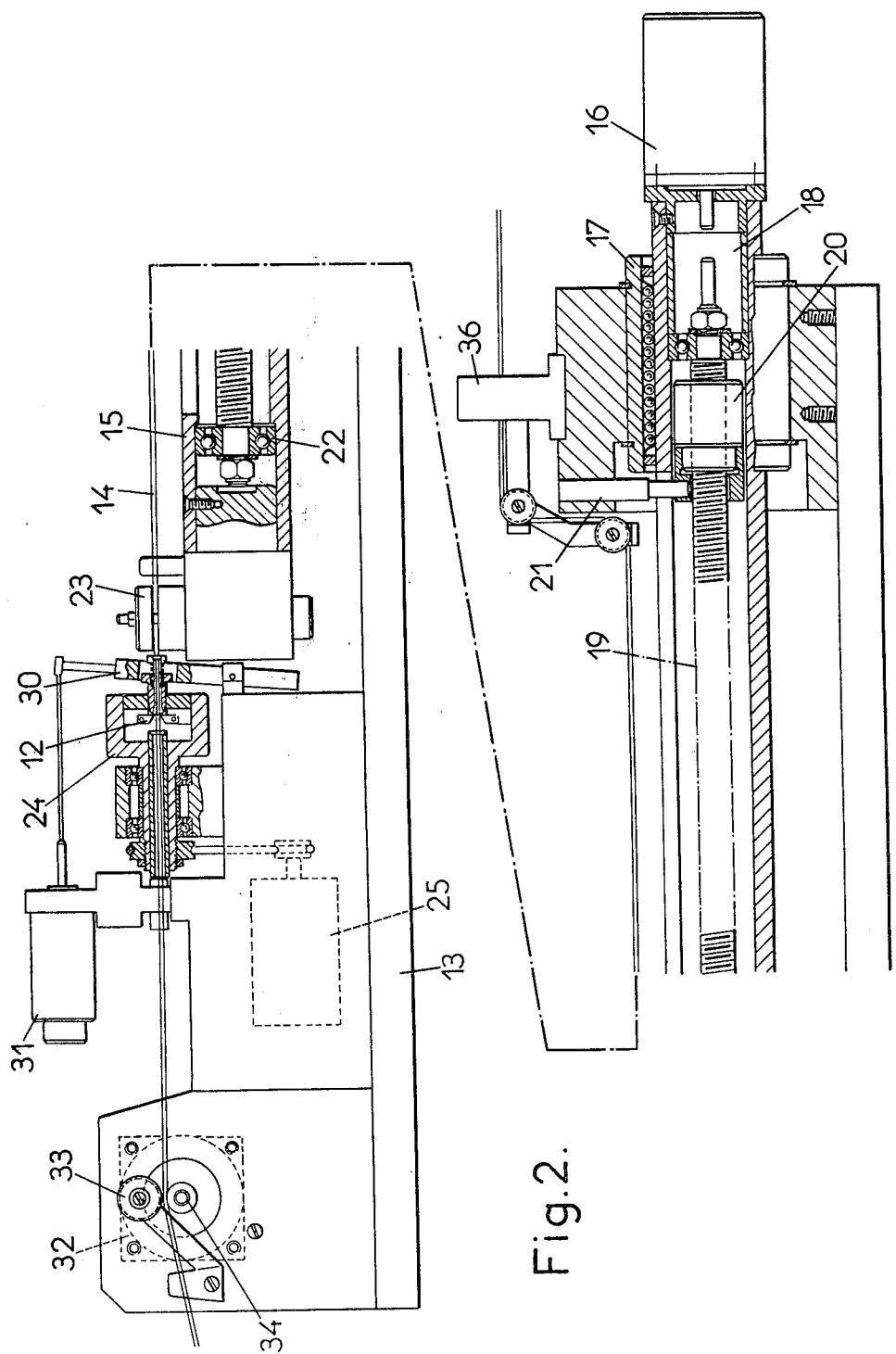
FIG. 2 is a schematic front view of an apparatus, in partial section along a vertical plane passing through the axis of the wire.

The process may be implemented automatically by means of the apparatus shown in FIG. 2.

This apparatus comprises a fixed support frame 13 carrying elements which may be considered as belonging to either of two assemblies, namely an assembly for axially moving the wire 14 to be processed and a stripping head.

The assembly for moving the wire comprises an axially movable member which may consist of a tube 15 mounted in a ball bearing 17 fixed to the frame, the bearing allowing the tube 15 to slide freely in the axial direction. A step-by-step motor 16 has a stator secured to the tube 15 and a rotor connected by a coupling joint 18, to a threaded rod 19. Rod 19 is threadedly connected to a ball nut 20 retained against rotation by a pin 21 which also prevents rotation of tube 15. Since nut 20 is retained against rotation, the rotary movement of the rotor of motor 16 is transformed into an axial movement of rod 19, rotatably connected to tube 15 by a bearing 22. Wire-clamping means 23 controlled by an electromagnet are carried on the end of tube 15 remote from motor 16.

Figure 3:
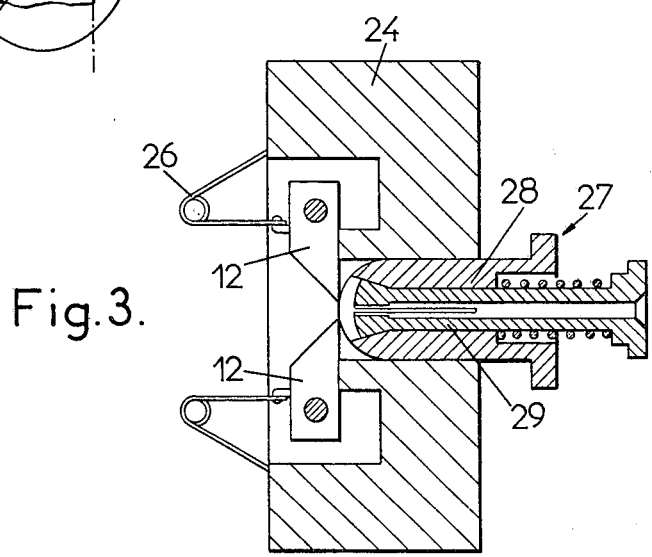
FIG. 3 is an enlarged representation of the wire-guide of the apparatus of FIG. 2.

The stripping head comprises a rotary spindle 24 rotated by an electric motor 25 (FIG. 2). Spindle 24 carries the stripping knives 12 which are movable between a radially outer or open position and a radially inner or closed position (FIG. 3). The knives, made from tungsten carbide for example, are retained on a slide by an axle and a return spring 26. Adjusting means (not shown) are provided for adjustment of the spacing of the knives when in closed position. Movements of the knives in the opening and closing direction are controlled in time relation with those of a wire-guide 27 comprising a sleeve 28 in which is placed clamping means 29 for accurately centering the wire. The guide may be axially moved by a control device comprising for example a lever 30 coupled by a linkage to the movable part of an electromagnet 31 (FIG. 2).

Before operation, the unit consisting of knives 12 and wire-guide 27 is first adjusted for a specific wire diameter. In particular, clamping means 29 are provided to accurately guide the wire and the spacing between knives 12 in their closed position is adjusted to be greater than the diameter of the metal core of the wire. The unit should however allow wire 14 to pass freely when the knives are open.

The apparatus further comprises a system for extracting the wire. It comprises a motor 32 whose rotational speed is chosen so that the speed of advance which it tends to impose on the wire is slightly greater than the speed at which the wire is fed by the assembly for axially moving the wire. A slipping movement should be accepted. For that purpose the wire may be driven by a friction roller 34 on which the wire 14 is pressed by a roller 33 which, furthermore, guides the wire. The wire finally is wound on a receiving reel (not shown).

A detection system 36 may be provided for detecting faults in the wire; that system is located between a supply reel (not shown) and the assembly for axial movement. That system sounds an alarm or stops the apparatus when the wire has a fault likely to be the source of a breakdown.

Figure 4:
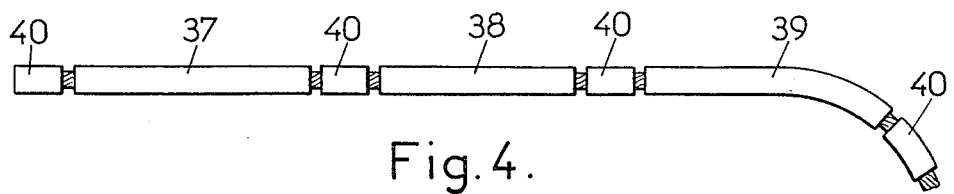
FIG. 4 is an illustration of a section of a coil of wire such as it appears after it has been subjected to a process according to a particular embodiment of the invention.

The described apparatus may be programmed to deliver a chain of prepared connecting wires, as shown schematically in FIG. 4 rather than sections of wire with stripped ends of the same length, which is a definite advantage. On the chain, the wiring operator successively finds all the wires 37, 38, 39, . . . of proper length, each separated from the next one by a section whose insulation material is cut, of constant length, corresponding to twice the stripped length required at the end of each wire section to effect a connection.

The operator will thus find all the successive connections in the order of the wiring list which he must follow. It is sufficient for him to cut the wire through the first short insulating section 40 and to withdraw the useless stubs of insulation material, then to continue in the same way. He may have a pair of cutting pliers provided with an adjustable stop. Then he cuts sections 40 at the desired position when the stop rests on the break in the insulating material. The apparatus may also be provided to make a cut in each section of insulation material at the place of severance. Such an arrangement is of considerable advantage when interconnecting a complex package.

The sequence of operations required for forming a chain as shown in FIG. 4 may be carried out by implementing the apparatus with a logic unit in the form of a circuit board carrying integrated circuits, a keyboard for entering data and a memory, for example in the form of a punched strip since the data transfer speeds required are low.

The punched strip will carry information representative of the length of each of the successive connecting wires to be formed in the chain, expressed as a forward advance of the step-by-step motor 16. The repetitive information, such as the length of section 40 to be left, may be stored in a PROM memory.

The operation sequence of the apparatus may be that shown schematically in the sequential diagram of FIG. 5, where each line indicates energization of the part bearing the same number in FIG. 2. The hatched zones on each line respectively indicate:

on line 31, the periods when the knives are opened by electromagnet 31, on line 23, the periods when wire 14 is clamped by the wire clamping means 23, on line 25, the periods when motor 25 is energized and the stripped head is rotated, on line 16, the periods when motor 16 is energized to move tube 15 in the direction shown by the corresponding arrow, on line 32, the periods of energization of motor 32 for tensioning wire 14.

At time $t_0$, i.e. at the end of a standby period, knives 12 are in spaced-apart position (line 31). At the end of a memorized time delay T, the logic unit causes motor 16 to be energized to move tube 15 to the right, i.e. towards the wire-supply reel. The extent of movement of the tube is represented by a corresponding number of advance steps. A comparator stops the movement when the actual number of steps corresponds to a stored number on the punched strip. In response to stopping of the tube at time $t_1$, the wire-clamping means (line 23) closes. At the end of time delay T, the logic unit delivers pulses to motor 16 for movement of the tube in the reverse direction, i.e. towards the stripping head, and at the same time energizes motor 32 (line 32). Once the tube has advanced by the length corresponding to the distance to achieve between two breaks in the insulating material, motors 16 and 32 are stopped, at time $t_2$.

Again after a time delay T, the logic unit causes the knives to close (line 31), the wire to be clamped by system 23 and the tube 15 to axially move over a short distance, for easier penetration of the knives into sheath 11 of the wire. The clamping ceases at time $t_3$ (line 23) at the same time as the tube stops (line 16). After a time delay T, the tube is brought back to its rest position, in which it is shown in FIG. 2 (line 16).

The cutting sequence properly speaking may then take place: the clamping means 23 are actuated to lock wire 14 (line 23). After the time delay T, motor 25 rotates the stripping head for a predetermined period of time, which terminates at time $t_5$ and the knives furrow a groove in insulation 11. Motor 25 is typically operated as a brake motor, to ensure rapid stopping of the rotation.

The sequence for breaking the sheath then begins. Tube 15 is axially moved to the right, after time delay T, over the distance required for breaking the insulation sheath in front of the knives, which are secured against rotation and anchored in the sheath, as shown in FIG. 1.

After that movement, the tube stops (time $t_6$) then is reset to its initial position by a movement which is the reverse of the preceding one, after a time delay T.

Finally, at time $t_7$, the knives are again opened by motor 31 (line 31). The cycle is then finished and the apparatus is again in standby condition. High accuracy may be achieved at a moderate cost. Satisfactory results have been obtained by using a threaded rod 19 with a pitch of 5.08 mm whose overall length provides a maximum movement of 254 mm. Motor 16 was chosen so as to obtain an incremental step of 25.4 microns. The repeatability of the advance movements was ±20 microns.

The logic unit can be quite conventional: the logic circuits may be integrated TTL circuits mounted on a printed circuit board and associated with digital display means and an input keyboard. The data may be carried by the punched strip in the form of blocks in the conventional ASCII code. High speeds of motor 16 (for example 2000 steps/second) may be achieved with a digital ramp generator which comes into action during accelerations and decelerations.

It should incidentally be noted that connecting wires may be prepared which are longer than the travel of 15, since the latter may make several reciprocations to bring each time a length of wire corresponding to its maximum movement, 254 mm in the case described above.

Numerous modified embodiments are possible and may be used for light conductors having a core and a light insulating sheath as well as for electric conductors. It is to be understood that the scope of the patent is limited by the appended claims only.

I claim:

1. A process for locally cutting the insulation sheath of an insulated wire at intervals, comprising the steps of:
   (a) locating said wire along a circulation path including clamping means and cutting means in succession,
   (b) moving said clamping means away from said cutting means while free from said wire and back toward said cutting means over a predetermined distance while actuated to grip said wire.
   (c) closing said cutting means over said wire by an extent sufficient to cut said sheath partially and rotating said cutting means about said wire to furrow a circular groove in said sheath, while maintaining said clamping means in actuated condition,
   (d) moving said clamping means away from said cutting means by an extent sufficient to break said sheath and back to its former position,
   (e) opening said cutting means and de-actuating said clamping means,
   (f) repeating steps (b) to (e) with optionally selected predetermined distances,
   whereby a continuous length of wire is produced whose insulation sheath is cut at a plurality of locations separated by said distances.

2. A process according to claim 1, wherein the successive distances over which said clamping means are moved during step (b) are selected to provide a wire length on which each other of said distances has a same length corresponding to twice the stripped length necessary at the end of a wire section for connecting purpose.

3. An apparatus for locally stripping an insulated wire, comprising: a frame; a stripping head mounted on said frame for rotation about an axis; a wire guide carried by said head coaxially with said axis; a drive motor operatively associated with said head for rotating said head about said axis; a set of knives carried by said axis to a position where they define a gap less than the diameter of a wire passage in said wire guide and away from said axis; and a unit for axially moving a wire projecting through said guide, comprising an axially movable member, motor means operatively connected to said axially movable member and adapted to move said axially movable member back and forth over controllable distances, motor controlled wire-clamping means carried by said axially movable member, and control means for successively actuating said clamping means for engaging said wire, energizing said motor means to move said clamping means and wire over a predetermined length, closing said knives and energizing said drive motor to cut the insulating material over a fraction of its thickness, stopping said drive motor, and energizing said motor means again to tension the wire and break the remaining thickness of the insulation material where partially cut by the knives.

4. Apparatus according to claim 3, wherein said axially movable member comprises a tube rotatably connected to a threaded rod and said motor means comprise a rotary step-by-step motor for rotating said rod in a fixed nut.

5. Apparatus according to claim 3, further comprising means for frictionally driving the wire, disposed downstream of the knives in the direction of advance of the wire, which in operation tends to impart to the wire a speed greater than that of said axially movable member.

6. Apparatus according to claim 3, wherein said wire-guide comprises a sleeve and clamping means carried by said sleeve and defining a passage whose diameter corresponds to that of the wire.

7. Apparatus according to claim 3, wherein said stripping head comprises an electromagnet for controlling the radial movement of said knives and said head is operatively associated with an electric motor supported by the frame and operative to rotate said head.

8. Apparatus according to claim 3, wherein said control means comprises programmable electronic means for controlling the operation of the apparatus according to a sequence providing, from a continuous wire, a chain of connection sections of variable length separated by shorter sections of fixed length whose insulation material is separated from that of the connection sections.

* * * * *